Oct. 26, 1937.  F. B. KENT ET AL  2,097,293
BROODER
Filed June 4, 1936  6 Sheets-Sheet 1

Inventor
F. B. Kent
J. L. Moffitt
By Clarence A. O'Brien
Hyman Berman
Attorneys

Oct. 26, 1937.  F. B. KENT ET AL  2,097,293
BROODER
Filed June 4, 1936  6 Sheets—Sheet 2
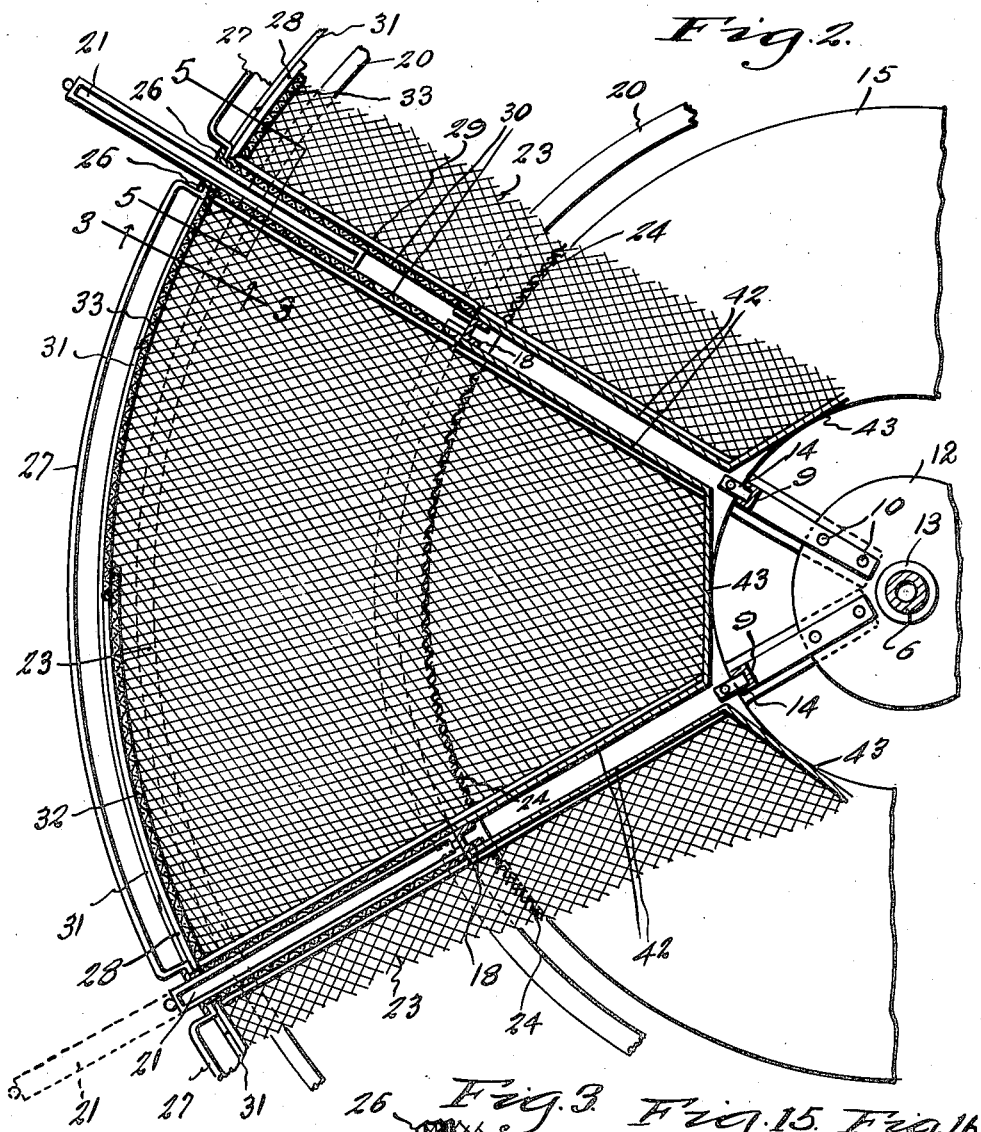
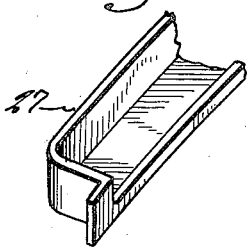
Inventor
F. B. Kent
J. L. Moffitt
By Clarence A. O'Brien and
Hyman Berman   Attorney

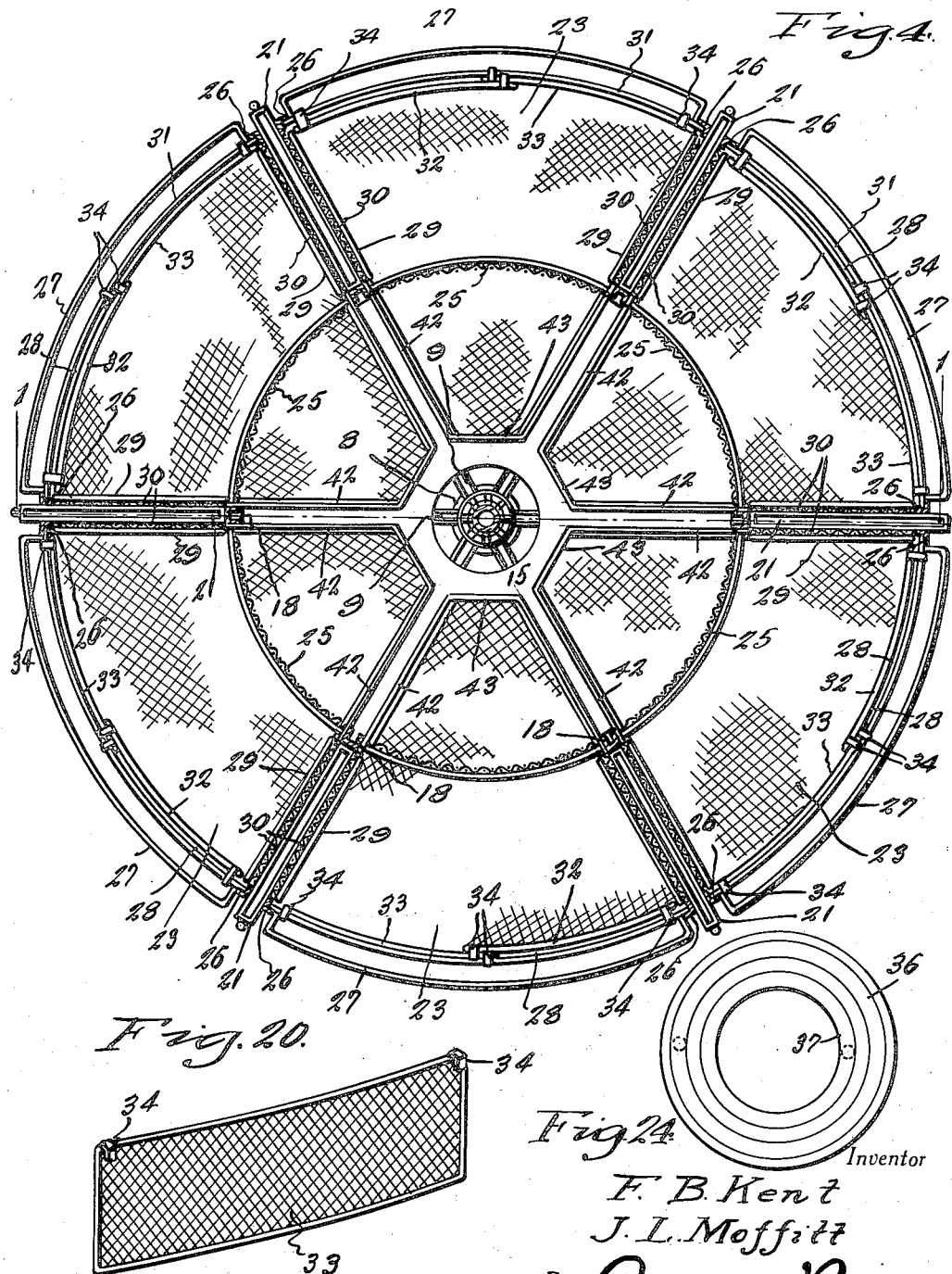

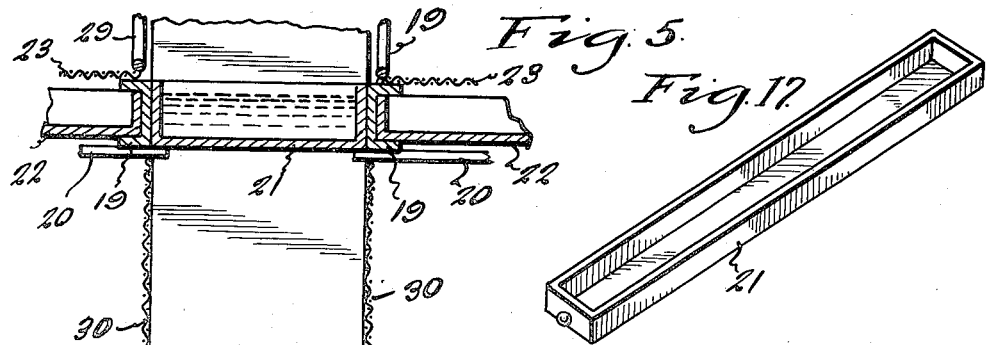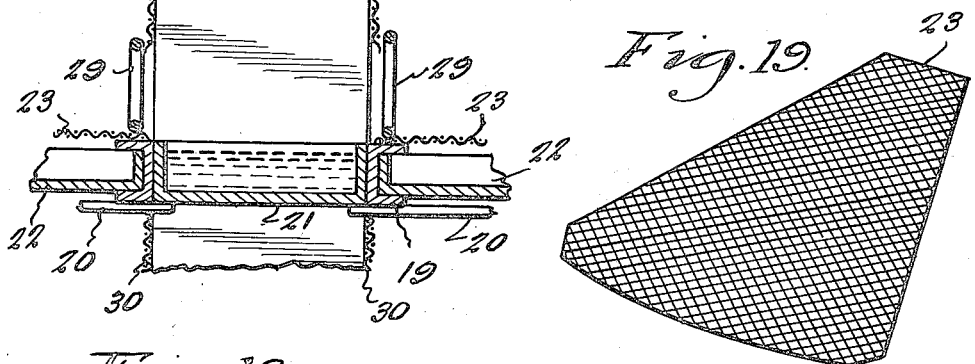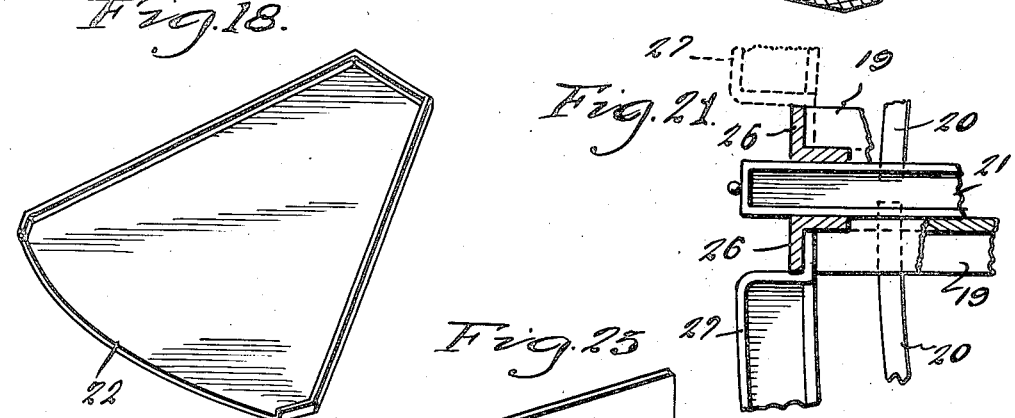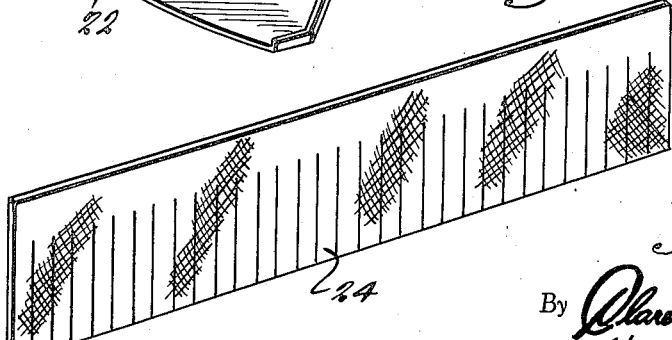

Oct. 26, 1937.   F. B. KENT ET AL   2,097,293
BROODER
Filed June 4, 1936   6 Sheets-Sheet 5
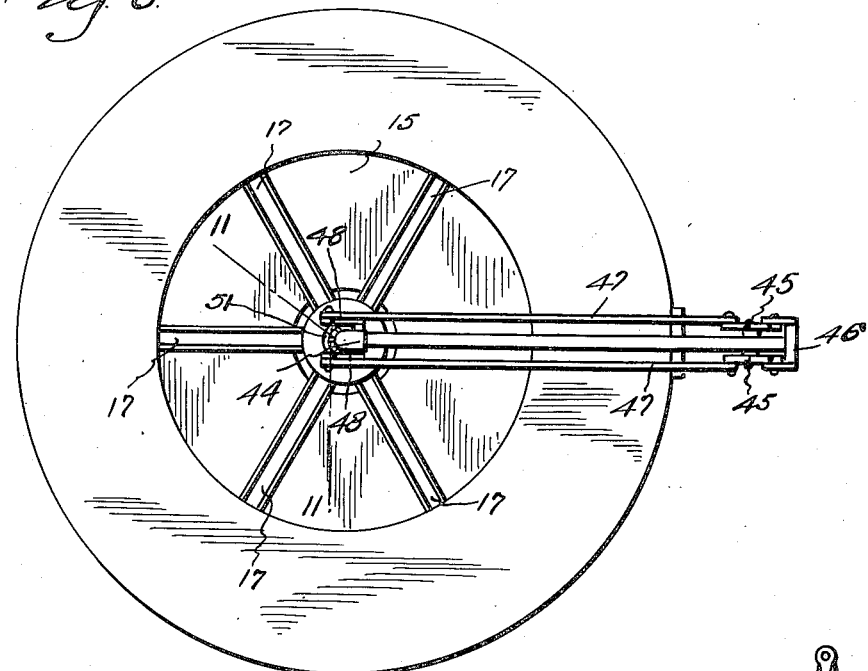
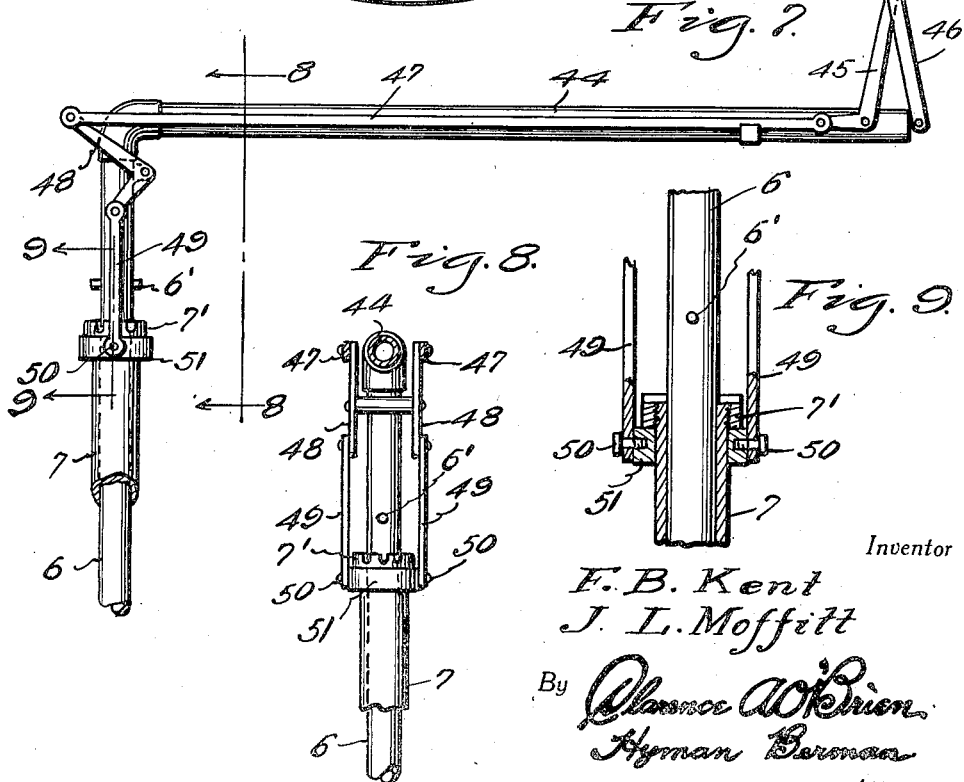
Inventor
F. B. Kent
J. L. Moffitt
By Clarence A. O'Brien
Hyman Berman
Attorneys

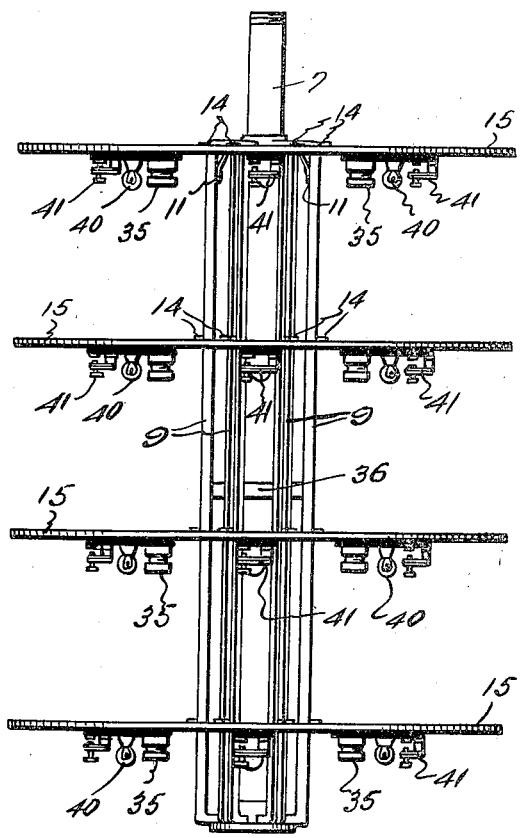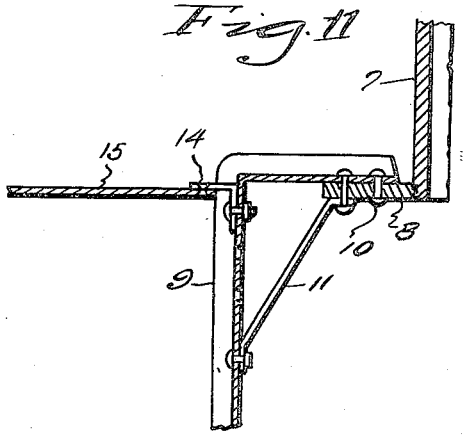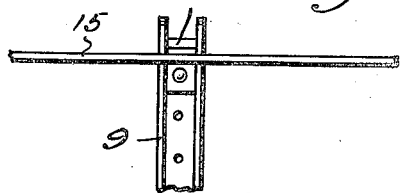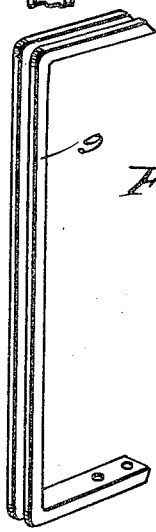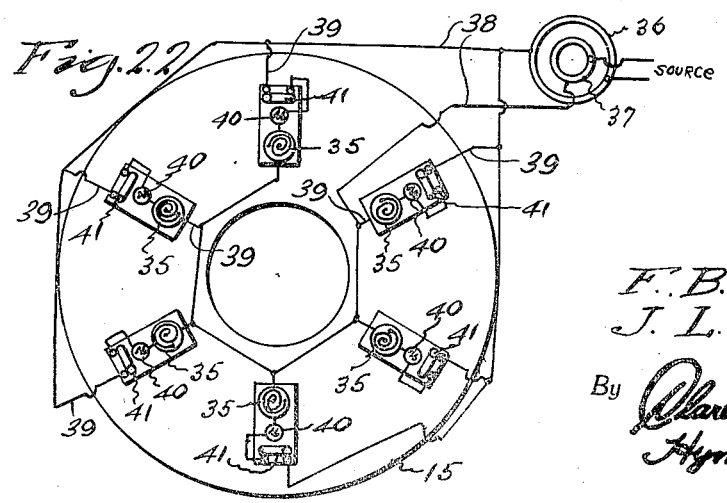

Patented Oct. 26, 1937

2,097,293

UNITED STATES PATENT OFFICE 2,097,293

BROODER

Fred B. Kent and John L. Moffitt, Columbia, Miss.

Application June 4, 1936, Serial No. 83,570

6 Claims. (Cl. 119—33)

Our invention pertains to brooders for taking care of young chicks in the period of time between hatching and marketing of the broilers.

The principal object of the invention is the provision of a brooder by the use of which chicks when first hatched may be maintained in a pen or a vertical series of pens subject to a heat of say 96 degrees F. for one week, after which the brooder cage may be turned through a part of a revolution to subject the same chicks for a period of one week to a lower temperature of say 90 degrees F., and then the brooder cage may be further turned through a part of a revolution to subject the same chicks for one week to a temperature of say 85 degrees F., and so on, step by step, until the same chicks are subjected for one week to a temperature of 70 degrees F. when the chicks will be fitted for removal from the brooder to be marketed as broilers.

Incidental to the said use of the brooder an operator can put 400 chicks in the pens alluded to (one hundred to each pen) each week and take out 400 each week and send them to market; it being understood that the rotatable brooder cage illustrated has six vertical sets of pens such as referred to about its center, and that by the described rotation of the brooder cage each week each batch of chicks can be progressed step by step from the first high temperature of 95 degrees F. to the last and low temperature of 70 degrees F.

Another object of the invention is the provision of a brooder embodying highly advantageous means for ventilation.

Another object of the invention is the provision of a brooder susceptible of ready and convenient manipulation.

Other objects and advantages of the invention will be fully understood from the following description and claims when the same are read in connection with the accompanying drawings, forming part of this specification, in which:—

Figure 2 represents a fragmentary enlarged sectional view taken substantially on line 2—2 of Figure 1.

Figure 3 represents a fragmentary vertical sectional view taken substantially on the line 3—3 of Figure 2.

Figure 4 represents a top plan view of the brooder cage with the cover removed.

Figure 5 represents an enlarged fragmentary sectional view taken substantially on line 5—5 of Figure 2.

Figure 6 represents a top plan view, on a reduced scale, of the brooder.

Figure 7 represents a fragmentary side elevational view of the means for controlling the cover assembly.

Figure 8 represents a sectional view taken substantially on line 8—8 of Figure 7.

Figure 9 represents a fragmentary detailed sectional view taken substantially on line 9—9 of Figure 7.

Figure 10 represents a side elevational view of the cover assembly.

Figure 11 represents a sectional view taken substantially on line 11—11 of Figure 6.

Figure 12 represents a fragmentary side elevational view of the upper portion of the cover assembly.

Figure 13 represents a perspective view of one of the cover assembly bars.

Figure 14 represents a fragmentary perspective view of one of the feed troughs.

Figure 15 represents a fragmentary perspective view of one of the feed guards.

Figure 16 represents a fragmentary perspective view of one of the water trough guards.

Figure 17 represents a perspective view of one of the water troughs.

Figure 18 represents a perspective view of one of the droppings trays.

Figure 19 represents a perspective view of one of the floors.

Figure 20 represents a perspective view of one of the slidable doors.

Figure 21 represents a fragmentary detailed horizontal sectional view showing the water and feed trough, said view being taken on the line 21—21 of Figure 1.

Figure 22 represents a diagrammatic view disclosing the electrical connection between the electrical elements involved.

Figure 23 is a perspective of one of the slitted curtains comprised in the chick pens.

Figure 1:
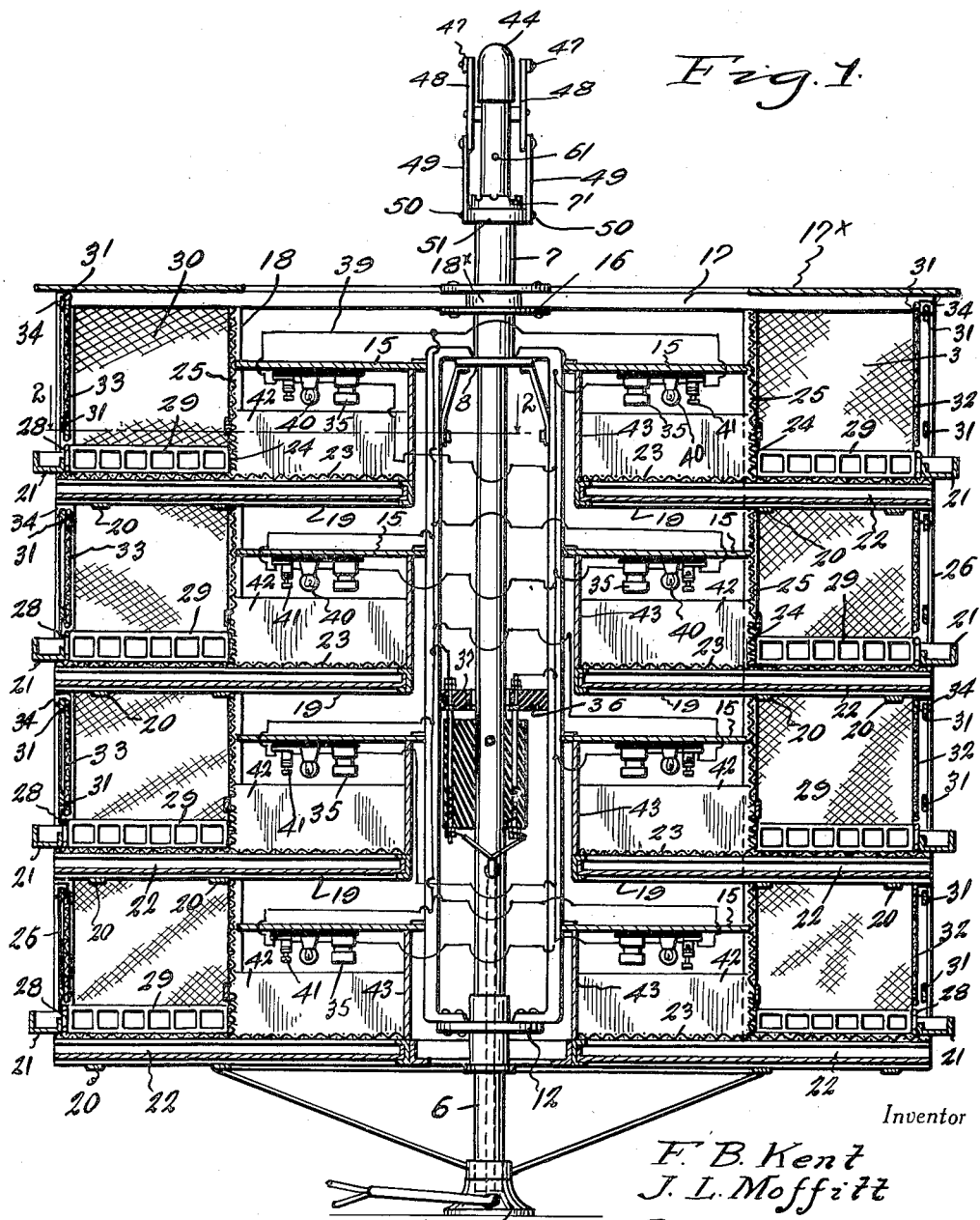
Figure 1 represents a vertical sectional view of the brooder in its entirety taken in the plane indicated by the line 1—1 of Figure 4, with some parts in elevation.

Figure 24 is a detail view of the dielectric ring on the arms 9 in which ring conductive rings 36 and 37 are embedded.

Referring to the drawings wherein like numerals designate like parts, it can be seen that numeral 5 represents a base upon which the upwardly extending post 6 is mounted.

On the upper end portion of this post 6 is a sleeve 7 which is provided at its lower end with an annular circumferentially extending sleeve 8 to which the upper ends of U-shaped bars 9 are secured as at 10 and braced as at 11. These bars 9 are also of U-shape cross section, Figure 12, and have their lower ends secured to the flange 12 on the slide collar 13 located on the post 6 adjacent the lower end thereof.

Brackets 14 on the bars 9 serve to secure the annular covers or cover plates 15 thereto at vertically spaced intervals, one plate 15 being provided for each section or story of the brooder cage; which sections or stories are arranged one above the other, Figure 1. Suitable adjusting means is provided for the brackets 14 to vary the positions of the cage plates 15.

Rotatable on the sleeve 7 is the hub 16 from which extend radially the bars 17 and depending from these bars 17 are the bars 18. At each section or story of the brooder cage, additional bars are provided and arranged in pairs 19—19. To maintain these pairs of bars 19—19 in parallel relation and in radially disposed groups in relation to the post 6, horizontally disposed arcuate connectors 20 are provided and project at their ends into the spaces between the complementary bars 19—19 to form the supports for the water troughs 21 in the manner substantially shown in Figure 5.

By particular reference to Figure 1 it will be noted that the four stories or sections of the brooder cage are tied together and to the bars 17 and top plate 17x, the sleeve 7 being adapted to freely move through a collar 18x at the inner ends of the bars 17.

The bars 19—19 are of U-shape in cross section and have their flanges disposed outwardly for the purpose of supporting intervening droppings trays 22 in the manner also shown in Figure 5. These trays 22 are slidable to permit removal and situated above each of these trays 22 is a mesh triangular shaped flooring 23 which is also removable.

As will be observed from Figures 1 and 4, the vertical bars 18 pass downwardly about midway between the ends of the floorings 23, and between the bars 18 and over the floorings 23, slitted curtains 24 are provided, Figure 1. Between these curtains 24 and the overlying bars 19, or in the case of the upper story, the bar 17, the mesh partitions 25, Figure 4, are provided, and inwardly of these mesh partitions 25, the plates 15 of the assembly shown in Figure 10 operate.

Vertical pairs of angle bars 26—26 are connected to the outer ends of the horizontal bars 19—19 and are sufficiently spaced to form guides for the water troughs 21. Interposed between spaced vertical angle bars 26 are the horizontally disposed feed troughs 27, Figure 3, guard gratings 28 being provided for these troughs 27, while guard gratings 29 are provided for the water troughs 21 in the space below the radial mesh partitions 30. (See Figure 5.)

Circumferentially extending rails 31 are provided, preferably two for each section or story of the brooder cage, and at each brooder pen. A pair of door sections of mesh construction are provided and denoted by numerals 32—33, Figure 4. Each of these door sections 32—33 is provided with a pair of hooks 34 which engage over the upper rails 31 of each section or story. Each door section bears against a lower rail 31 of each section or story of the brooder cage, Figure 3, and the door sections 32, 33 can be slid into overlapping relation to permit access to their particular pens.

As is clearly shown in Figure 22, each of the plates 15 is provided with a plurality of heaters 35 which are also shown in Figure 1. A pair of conductor rings 36—37 are supported by the bars 9 to afford electric current transmission from the bus bars 38 to the conductors 39, to which the heaters 35 are connected in the manner clearly shown in Figure 22.

A pilot light 40 is preferably installed in the heater circuit and a suitable thermostat 41 is also employed.

The cover assembly is slidable as a unit vertically so as to move the covers or cover plates 15 upwardly or downwardly to regulate the ventilation in the pens, which are defined each by a curtain 24, side walls 42 and a back wall 43. (See Figure 1.)

To afford vertical adjustment, the upper end of the shaft 6 is provided with a laterally disposed arm 44 on the outer end of which the rockable assembly or lever 45 is provided, the same having a pivoted handle 46. Connected to this assembly or lever 45 are the connecting rods 47 extending from the rocker members 48 and from these rocker members 48 extend the links 49 pivotally connected as at 50 to a collar 51 on the aforementioned sleeve 7.

It will be apparent from the foregoing that the cage of our brooder as shown embodies four stories or sections one above the other, and that each story or section of the cage has six pens for the reception of chicks, each pen with a curtain 24, Figure 1; also, that there is an annular cover or cover plate 15 above and complementary to each of the four stories or sections of the brooder cage.

It will also be understood that when the pivoted handle 46 is moved to its lowest position, the notched cuff or top 7' of the sleeve 7 will, through the interposed connection shown and described, be engaged with the pin 6' on the post 6 and at the same time all of the covers 15 will be raised and locked against turning to the fixed post 6 so that the brooder cage as a whole can be turned about the post 6 relatively to and independently of the covers 15 and the heating equipments carried thereby.

When the covers 15 are raised as stated they allow a complete change of air in the pens of the brooder cage. It will also be understood that when the pivoted handle 46 is permitted by the operator to move upwardly from the lower position the covers 15 will be lowered to their working positions relatively to the one above the other stories or sections of the brooder cage.

In the use of the brooder, after the covers 15 are let down, the chicks in one vertical set of pens in the brooder cage are subject to a heat of say 95 degrees F. for one week. Then the hand lever 46 is pulled downwardly to raise the covers 15, and the brooder cage is turned through a part of a revolution to position the mentioned vertical set of pens under heaters set to furnish a heat of 90 degrees F., after which the covers 15 are lowered and the chicks in said set of pens are permitted to remain in said temperature one week. This operation is repeated once a week, the temperature to which the chicks are subjected in said vertical set of pens being lowered to the extent of 5 degrees F. following each turning of the brooder cage until finally the chicks in said vertical set of pens will be subjected for one week to a temperature of 70 degrees F. after which the said chicks will be fit to be removed from the brooder and marketed.

It will be manifest from the foregoing that as the brooder cage is turned step by step once a week, the chicks in each vertical set of pens without handling will be shifted from one temperature to a temperature five degrees cooler; also, that following the subjection of the first batch of chicks to the temperature of 95 degrees F. for one week and the turning of the brooder cage after the covers 15 are lifted, a batch of newly hatched chicks is placed in the vertical set of pens behind the mentioned set of pens, with reference to the direction in which the brooder cage is turned, and thereafter the operator can put say 400 chicks in the brooder cage (one hundred in each pen) each week, and remove four hundred chicks from the brooder cage each week and send the chicks to market.

We would also have it understood that if the operator desires to fill all of the twenty four pens of the brooder cage to capacity at one time he can set all of the heating units at the desired temperature, and manipulate the covers 15 at intervals for ventilating purposes.

There are twenty four electrical heating units employed, one unit complementary to each of the twenty four pens in the brooder cage, and each unit includes a heater 35, preferably a resistance coil, a pilot light 40 and a thermostat 41. Some of the heating units are shown in Figure 1, and said Figure 1 also adequately shows the electric connections between the heating units mentioned and the opposite sides of a source of electric energy.

While the foregoing specification sets forth the invention in specific terms, it is to be understood that numerous changes in the shape, size and materials may be resorted to without departing from the spirit and scope of the invention as claimed hereinafter.

Having thus described our invention what we claim as new is:—

1. In a brooder and in combination, a cover, a member turnable about its axis below and relatively to the cover and having a circular series of pens for chicks, and heaters carried at the underside of the cover and above the chicken pens; the said heaters being adapted to supply different degrees of heat whereby chicks when first placed in a pen of the turnable member may be subjected to a high degree of heat for a predetermined period of time, and then on turning of the turnable member through a part of a revolution the chicks may be subjected to a less degree of heat for a predetermined period of time and so on step by step until finally for a predetermined period of time the chicks may be subject to a comparatively low degree of heat to fit them at the expiration of the last period of time for removal from the brooder.

2. In a brooder and in combination, a central support, a plurality of covers spaced one above the other on said support, members on and turnable about the central support below and relatively to the covers and connected in one unit and each having a circular series of pens for chicks, and heaters carried at the undersides of the covers and above the chicken pens in the turnable members below the covers; the said heaters being adapted to supply different degrees of heat, whereby chicks when first placed in a vertical set of pens of the turnable members may be subjected to a high degree of heat for a predetermined time, and then on turning of the connected turnable members through a part of a revolution the chicks may be subjected to a less degree of heat for a predetermined period of time and so on step by step until finally for a predetermined period of time the chicks may be subjected to a comparatively low degree of heat to fit them at the expiration of the last period of time for removal from the brooder.

3. A brooder of the character described comprising a cage having a plurality of superimposed sections, each divided into a plurality of poultry containing pens, an upright upon which the sections are mounted for rotation, a heating unit for each pen of each of the sections, a cover plate above each of said sections, said cover plates carrying said heating units, and means for lifting said cover plates.

4. In a brooder and in combination, a central post, a cage turnable about the post and having a plurality of annular sections one above the other and a circular series of chick pens in each section, a vertical series of annular cover plates about the post and disposed above the chick pens of the cage sections and connected together to move as a unit relatively to said pens, and manual means for raising said cover plates.

5. In a brooder and in combination, a central post, a cage turnable about the post and having a plurality of annular sections one above the other and a circular series of chick pens in each section, a vertical series of annular cover plates about the post and disposed above the chick pens of the cage sections and connected together to move as a unit relatively to said pens; the said post having a lateral arm above the basket, a hand lever at the outer end of said arm, and a connection between said hand lever and the connected cover plates whereby when the lever is manually moved the cover plates will be raised.

6. In a brooder and in combination, a central post, a cage turnable about the post and having a plurality of annular sections one above the other and a circular series of chick pens in each section, a vertical series of annular cover plates about the post and disposed above the chick pens of the cage sections and connected together to move as a unit relatively to said pens, heaters complementary to the chick pens and carried at the undersides of said cover plates, and manual means for raising said cover plates.

J. L. MOFFITT.
FRED B. KENT.